United States Patent Office 3,465,062
Patented Sept. 2, 1969

3,465,062
STABLE POLYPHENYLENE ETHER COMPOSITION
Klaus E. Holoch, Peter F. Erhardt, and Kenneth W. Benner, Pittsfield, Mass., assignors to General Electric Company, a corporation of New York
No Drawing. Filed Feb. 2, 1967, Ser. No. 613,451
Int. Cl. C08g 51/56, 51/60
U.S. Cl. 260—874                7 Claims

---

ABSTRACT OF THE DISCLOSURE

A stabilized polyphenylene ether composition consisting of a major portion of polyphenylene ether and a minor portion of a stabilizer consisting of a hexaalkylphosphoric triamide, a boron compound and a hydrazine.

---

This invention relates to polyphenylene ether plastics and more particularly, to the stabilization of such plastics with a stabilizer consisting of a hexaalkylphosphoric triamide, a boron compound and a hydrazine.

It is known that the polyphenylene ethers, and particularly, the 2,6-dialkyl substituted polyphenylene ethers, are somewhat unstable under the influence of heat and light exposure causing the resin to become dark colored, brittle and undesirable for many uses. The cause of the degradation is not fully understood, but is believed to be due, in part, to the presence of hydroxyl groups on the polymer chain, a sensitivity to oxygen containing atmosphere and the degradative effects of traces of impurities present in the resin composition.

The term "polyphenylene ether" includes those polymers disclosed and claimed in U.S. patents of Allan S. Hay, Nos. 3,306,874 and 3,306,875; the polymers disclosed and claimed in U.S. Patents Nos. 3,257,357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, polystyrenes, polycarbonates and the like wherein the polyphenylene ether is present in an amount sufficient to effect the properties of the polymer composition due to the influence of heat and light.

Heretofore a large number of different compounds such as the phenolic antioxidants exemplified by p-phenylphenol, N-steroyl-p-aminophenol and 2,2' methylenebis (4-ethyl-6-tert. butylphenol) have been used as heat and light stabilizers for the polyphenylene ether compositions. These stabilizers were generally unsatisfactory for even short exposure to heat. Other stabilizers such as the ketenes, benzoic anhydride and the mercaptobenzimidazoles have also been tried and have been found to be effective for short periods of exposure to heat, but not for the relatively long exposures required for many commercial uses.

In copending U.S. patent application, Ser. No. 610,134 it is disclosed that the addition of a small amount of a hexaalkylphosphoric triamide is a very effective stabilizer for the polyphenylene ethers when added in an amount ranging about between 0.01 and about 10% by weight, calculated on the polymer. The hexaalkylphosphoric triamides may be represented by the following general formula:

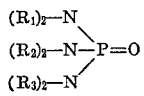

wherein $R_1$, $R_2$ and $R_3$ represent alkyl groups of from 1 to 6 carbon atoms.

It has now been found that a stabilizing combination of hexaalkylphosphoric triamide, a boron compound, a hydrazine, and optionally phosphorus acid or phosphorus pentoxide used in combination with a polyphenylene ether result in a polymer having a much greater stability to heat and light as exemplified by time to embrittlement increase of at least 150% as compared to a polyphenylene ether containing only a hexaalkylphosphoric triamide.

The boron compound component of the stabilizer combination is a member selected from the group consisting of:

(1) boron oxide ($B_2O_3$), and
(2) boron acids of the formula

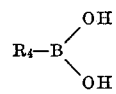

wherein $R_4$ is a member selected from the group consisting of hydroxyl, alkyl having from 1 to 15 carbon atoms and monocyclic aryl.

Typical boron acids corresponding to the formula set forth in subparagraph (2) above, are, for example, boric acid, methylboric acid, ethylboric acid, butylboric acid, hexylboric acid, phenylboric acid, methylphenylboric acid, xylyboric acid, 2,2' - dimethylheptylboric acid, 2-methyl-3-ethyloctylboric acid, etc.

The hydrazines that may be used in the stabilizer combination may be represented by the following general formula:

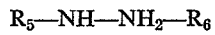

wherein $R_5$ is a monovalent acyl radical of a carboxylic acid and $R_6$ is a monocyclic aryl radical.

Typical examples of hydrazines that may be used in the stabilizer composition of this invention, are, for example benzoylphenylhydrazine, acetylphenylhydrazine, propanoylphenylhydrazine butyryl phenylhydrazine, etc.

Phosphorus acid or phosphorus pentoxide may be added to the stabilizer composition in addition to the above components if desired, but this is not an essential ingredient.

The amount of stabilizer added to the polyphenylene ether depends upon the activity of the stabilizer, the quality of the polyphenylene ether to be stabilized and the conditions to which the polymer is to be exposed. The stabilizer may be added in an amount of between about 0.1% and about 10% by weight calculated on the polymer and preferably in an amount of between 1.0% and 8.0% by weight calculated on the polymer. In general, the hexaalkylphosphoric triamide should be added in an amount at least equal to the remaining components in the stabilizer combination and preferably in an amount equivalent to at least 1.5 times the remaining ingredients in the stabilizer composition. In a preferred embodiment, the hexaalkylphosphoric triamide is present in an amount ranging between 1.0 and 3.0% by weight, the boron compound is present in an amount ranging between 1.0 and 2.0% by weight, the hydrazine is present in an amount ranging between 1.0 and 2.0% by weight, and the phosphorus acid or phosphorus pentoxide is present in an amount ranging between 0 and 0.5% by weight, all calculated on the polymer.

The manner of adding the stabilizer to the polyphenylene ether is not critical to this invention. Hence, any convenient method can be employed. For example, the stabilizer can be blended with resin powder in a blender such as a Waring blender. Alternatively, the resin can be dissolved in a suitable solvent and the stabilizer added to the solution. The stabilized polymer may then be recovered from solution.

The stabilized compositions of this invention are useful for all purposes for which the polyphenylene ethers have hitherto been used, for example, for conversion to films, fibers, molded articles and the like by conventional methods.

The following examples serve to illustrate the invention but they are not intended to limit it thereto, the parts being by weight unless otherwise stated.

TABLE II

| Example No. | Stabilizer Composition | Polystyrene (percent) | Time to Embrittle (hrs.) at— | | | |
|---|---|---|---|---|---|---|
| | | | 105° C. | 115° C. | 125° C. | 150° C. |
| 8 | Control (no additive) | 17 | 300 | 225 | 190 | 25 |
| 9 | 2.0% hexamethylphosphoric triamide | 17 | 480 | 295 | 230 | 65 |
| 10 | 2.0% hexamethylphosphoric triamide, 1.0% B₂O₃ | 17 | 1,020 | 630 | 580 | 210 |
| 11 | 2.0% hexamethylphosphoric triamide, 1.0% H₃BO₃ | 17 | 975 | 650 | 500 | 205 |
| 12 | 1.0% hexamethylphosphoric triamide, 0.5% B₂O₃, 1.0% acetylphenylhydrazine, 0.1% P₂O₅ | 17 | | | 1,550 | 480 |
| 13 | 1.0% hexamethylphosphoric triamide, 1.0% H₃BO₃, 1.0% acetylphenlhydrazine, 0.1% H₃PO₃ | 17 | | | | 470 |
| 14 | 1.0% hexamethylphosphoric triamide, 1.0% H₃BO₃, 1.0% acetylphenylhydrazine | | | | | 430 |
| 15 | 1.0% hexamethylphosphoric triamide, 0.5% B₂O₃, 1.0% acetylphenylhydrazine | 25 | 7,505 | | | |
| 16 | 1.0% hexamethylphosphoric triamide, 0.5% B₂O₃, 1.0% acetylpenylhydrazine, 0.1% H₃PO₃ | 25 | 7,505 | | | |
| 17 | 1.0% hexamethylphosphoric triamide, 0.2% B₂O₃, 1.0% acetylphenylhydrazine | 25 | 7,505 | | | |
| 18 | 1.0% hexamethylphosphoric triamide, 1.0% H₃BO₃, 1.0% acetylphenylhydrazine | 25 | 900 | | | |
| 19 | 1.0% hexamethylphosphoric triamide, 1.0% H₃BO₃, 1.0% acetylphenylhydrazine, 0.1% H₃PO₃ | 25 | 1,100 | | | |

EXAMPLE 1

This example illustrates a process for the formation of samples of a polyphenylene ether containing various stabilizers as well as a method for evaluation of the stabilized samples.

Resin, in powder form, and an appropriate stabilizer are blended together in a Waring blender for a period of 1 to 2 minutes. The mixture is then fed to an extruder and extruded at a temperature of 500–600° F. The extruded strands are chopped into pellets. Two-gram samples of the pellets are molded into films by preheating the samples for 1 minute at 550° F. and thereafter molding at a pressure of 20,000 p.s.i. at a temperature of 550° F. for 1 minute. The films so prepared have a thickness of 10 mils. They are cut into strips, measuring 4 by 0.5 inches and placed in an air circulating oven, maintained at an elevated temperature. Time to embrittle is measured for each of the film samples by folding the samples at various times during the heat aging process until a film strip embrittles to a point where it snaps when partially folded. This time is defined as the time to embrittlement.

EXAMPLES 2 TO 7

The polyphenylene ether used in these examples is a poly (2,6-dimethyl-1,4-phenylene) ether. Heat aging was conducted at a temperature of 175° C. The stabilizer compositions and times to embrittle are set forth in Table I below:

TABLE I

| Example Number | Composition | Time to Embrittle (hrs.) |
|---|---|---|
| 2 | Control (no additive) | 30 |
| 3 | 2.0% hexamethylphosphoric triamide | 60 |
| 4 | 2.0% hexamethylphosphoric triamide, 1.0% B₂O₃ | 150 |
| 5 | 2.0% hexamethylphosphoric triamide, 1.0% H₃BO₃ | 140 |
| 6 | 3.0% hexamethylphosphoric triamide, 1.0% B₂O₃, 1.0% acetylphenylhydrazine | 320 |
| 7 | 2.0% hexamethylphosphoric triamide, 1.0% H₃BO₃, 1.0% acetylphenylhydrazine | 280 |

EXAMPLES 8 TO 19

Following the procedure of Example 1, samples were prepared from a resin consisting of a poly (2,6-dimethyl-1,4-phenylene) ether and polystyrene. Table II indicates the stabilizer compositions, the quantity of polystyrene in the polymer and the time to embrittle. Four heat aging temperatures were used: 105° C., 115° C., 125° C., and 150° C.

EXAMPLE 20

A polyphenylene ether plus 1.0% hexabutylphosphoric triamide plus 1.0% phenylboric acid plus 1.0% acetylphenylhydrazine would be expected to give results similar to those obtained in Example 8, Table I.

EXAMPLE 21

A mixture of a polyphenylene ether and polystyrene plus 1.0% hexaethylphosphoric triamide plus 0.5 B₂O₃ plus 1.0% acetylphenylhydrazine plus 0.1% P₂O₅ would be expected to give results similar to those obtained in Example 12, Table II.

EXAMPLE 22

A mixture of a polyphenylene ether and a polystyrene plus 1.0% hexapropylphosphoric triamide plus 1.0% phenylboric acid plus 1.0% propanoylphenylhydrazine plus 0.1% H₃PO₃ would be expected to give results similar to those obtained in Example 13, Table II.

EXAMPLE 24

A mixture of a polyphenylene ether and a polystyrene plus 1.0% hexamethylphosphoric triamide plus 0.5% B₂O₃ plus 1.0% acetylphenylhydrazine would be expected to give results similar to those obtained in Example 15, Table II.

It should be understood that the invention is susceptible to further modification within the scope of the appended claims.

What we claim as new and desire to secure by Letters Patent of the United States is:

1. A stabilized polyphenylene ether composition consisting of a major portion of a polyphenylene ether and a stabilizing quantity of a stabilizer consisting essentially of:

(1) a hexalkylphosphoric triamide of the formula:

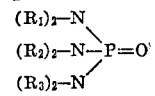

where $R_1$, $R_2$ and $R_3$ are alkyl groups having from 1 to 6 carbon atoms;

(2) a boron compound selected from the group consisting of
  (a) boron oxide and
  (b) boric acid of the formula

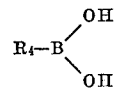

wherein $R_4$ is a member selected from the group consisting of hydroxyl, alkyl having from 1 to 15 carbon atoms and monocyclic aryl; and (3) a hydrazine having the formula:

$$R_5-NH-NH_2-R_6$$

wherein $R_5$ is a monovalent acyl radical of a carboxylic acid and $R_6$ is a monocyclic aryl radical, said hexaalkylphosphoric triamide being present in an amount at least equal to the remaining components in the stabilizer combination.

2. The stabilized polyphenylene ether composition of claim 1 wherein the polyphenylene ether is a poly(2,6-dimethyl-1,4-phenylene) ether.

3. The stabilized polyphenylene ether composition of claim 1 wherein the polymer is a mixture of a poly(2,6-dimethyl-1,4-phenylene) ether and a polystyrene.

4. The stabilized polyphenylene ether composition of claim 1 wherein the stabilizer constitutes from 1.0 to 10.0% by weight of the composition calculated on the polymer.

5. The stabilized polyphenylene ether composition of claim 1 wherein the stabilizer consists essentially of:
  (1) from 1.0 to 3.0% hexamethylphosphoric triamide,
  (2) from 1.0 to 2.0% $B_2O_3$, and
  (3) from 1.0 to 2.0% acetylphenylhydrazine.

6. The stabilized polyphenylene ether composition of claim 1 wherein the stabilizer consists essentially of:
  (1) from 1.0 to 3.0% hexamethylphosphoric triamide,
  (2) from 1.0 to 2.0% $H_3BO_3$, and
  (3) from 1.0 to 2.0% acetylphenylhydrazine.

7. A stabilizer combination consisting essentially of:
  (1) a hexalkylphosphoric triamide of the formula:

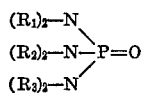

wherein $R_1$, $R_2$ and $R_3$ are alkyl groups having from 1 to 6 carbon atoms;
  (2) a boron compound selected from the group consisting of
    (a) boron oxide and
    (b) boric acid of the formula

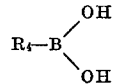

wherein $R_4$ is a member selected from the group consisting of hydroxyl, alkyl having from 1 to 15 carbon atoms and monocyclic aryl; and
  (3) a hydrazine having the formula:

$$R_5-NH-NH_2-R_6$$

wherein $R_5$ is a monovalent acyl radical of a carboxylic acid and $R_6$ is a monocyclic aryl radical.

References Cited

UNITED STATES PATENTS

| | | | |
|---|---|---|---|
| 3,100,197 | 8/1963 | Heuck et al. | 260—45.9 |
| 3,110,696 | 11/1963 | Dexter | 260—45.8 |
| 3,131,164 | 4/1964 | Doyle et al. | |
| 3,134,753 | 5/1964 | Kwiatek | 260—47 |
| 3,159,598 | 12/1964 | MacFarlane | 260—45.9 |
| 3,244,662 | 4/1966 | Strauss et al. | 260—45.7 |
| 3,294,730 | 12/1966 | Jukes | 260—45.7 |
| 3,306,875 | 2/1967 | Hay | 260—47 |

HOSEA E. TAYLOR, JR., Primary Examiner

U.S. Cl. X.R.

252—400, 401; 260—45.7, 45.9, 47